United States Patent Office 3,769,278
Patented Oct. 30, 1973

3,769,278
ANTIHYPERTENSIVE 6-SUBSTITUTED 3-HYDRA-
ZINO-PYRIDAZINES AND THEIR PREPARATION
Giorgio Pifferi, Milan, Italy, assignor to
I.S.F. S.p.A., Milan, Italy
No Drawing. Filed Aug. 4, 1971, Ser. No. 169,089
Claims priority, application Italy, Dec. 15, 1970,
33,025/70
Int. Cl. C07d 51/02
U.S. Cl. 260—240 G   6 Claims

ABSTRACT OF THE DISCLOSURE

Antihypertensive compounds comprise 3-hydrazino-pyridazine derivatives substituted in the 6-position with an N-(2-hydroxypropyl) amino group. A new method for the preparation of these compounds involves the intermediate isolation of their hydrazones and subsequent decomposition of the hydrazones with an acid to form the desired hydrazino derivatives.

SUMMARY OF THE INVENTION

This invention refers to 3-hydrazino-pyridazines substituted in the 6-position by a N-(2-hydroxy-propyl)-amine radical having an antihyptertensive action and denoting a high therapeutical coefficient and a long-lasting hypotensive effect.

The invention refers furthermore to the intermediates for the preparation of said compounds and to the process for obtaining both the intermediate and final compounds.

This invention provides a new series of antihypertensive compounds having a high therapeutic factor and a long-term hypotensive effect.

More particularly, this invention provides new derivatives of 3-hydrazino-pyridazine substituted in the 6-position and a new process for their preparation and separation from the reaction mixture. The invention also provides antihypertensive pharmaceuticals containing said compounds as the active ingredient and the use of said pharmaceuticals for the treatment of hypertension.

Some 6-substituted 3-hydrazino-pyridazine derivatives, although having a definite antihypertensive activity, are known to have also a non-negligible toxicity which substantially restricts the usefulness of the pharmaceutical especially in the case, which is in fact rather frequent in hypertension, of a long-lasting treatment.

It has now been found surprisingly that when 3-hydrazino-pyridazine is substituted in the 6-position with the N-(2-hydroxypropyl)-amino radical a new series of pyridazines is obtained, which are also active on the blood pressure of animals at doses of approximately 0.1 mg./kg. i.v. and which have a quite negligible toxicity of more than 1000 mg./kg.

The new compounds of the invention are 6-substituted 3-hydrazino-pyridazines of the General Formula I

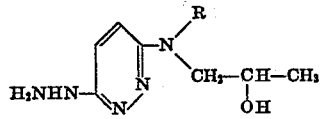

wherein R is selected from the group consisting of —CH₃, —C₂H₅, —C₃H₇, —CH₂CH₂OH and
—CH₂—CH(OH)—CH₃, and their non-toxic salts with common mineral acids.

In another aspect, the invention provides compounds of the General Formula:

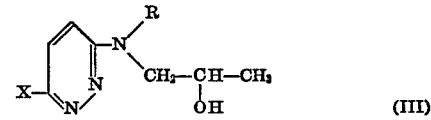

(III)

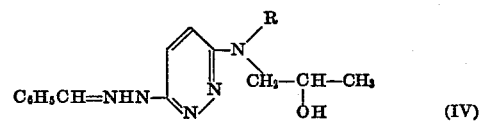

(IV)

wherein R is selected from the group consisting of —CH₃, —C₂H₅, —C₃H₇, —CH₂CH₂OH and
—CH₂—CH(OH)CH₃ and X is selected from the group consisting of Cl and Br, which are useful intermediates for the synthesis of Compounds I.

It is well known that 6-substituted 3-hydrazinopyridazines are generally obtained in two operational steps, reacting, for instance, 3,6-dichloropyridazine with a secondary amine in a suitable solvent, and heating the resulting product with hydrazine. However, when applied to derivatives of Formula I, said procedure does not lead to good results because of several reasons, such as the chemical instabilit yof hydrazino bases, the very high water solubility of these products, and the ensuing difficulties in the separation and purification of the hydrochlorides.

The claimant has invented a process for the preparation and separation of compounds of Formula I, which offers considerable practical advantages as compared to the existing methods. Therefore, this invention provides a process for the preparation of 6-substituted 3-hydrazino-pyridazines wherein a 3,6-dihalogenopyridazine is reacted with the suitable aminoalcohol, the obtained 6-substituted 3-halogenopyridazine is reacted with hydrazine in excess, and the reaction mixture is finally reacted, in the presence of an alkali carbonate or bicarbonate, with benzaldehyde or with a ring-substituted benzaldehyde derivative, which, when treated with hydrazine, yields double bases that are soluble in organic solvents such as ether, benzene, and so forth.

There is thus obtained the hydrazone of the 6-substituted 3-hydrazinopyridazine, that is present in the reaction mixture together with benzaldazine (or other double base) resulting from the reactions, between benzaldehyde (or other aldehyde) and excess hydrazine. The double base formed with hydrazine is subsequently eliminated by extraction with ether or benzene. The hydrazone, recrystallized from the residual solution, is heated with an acid removable by distillation (preferably dilute hydrochloric acid), thus it is split into the corresponding aldehyde (which is also removable by distillation or steam distillation) and into Compound I, which can be recovered in condition of purity by simply evaporating the solution to dryness. When the acid being employed is hydrochloric, the product is recovered in the form of dihydrochloride.

The process just described can be synthesized in the following outline (wherein the 3,6-dihalogenopyridazine is 3,6-dichloropyridazine; R is defined exactly as previously, the aldehyde being used is benzaldehyde; and the acid is hydrochloric acid):

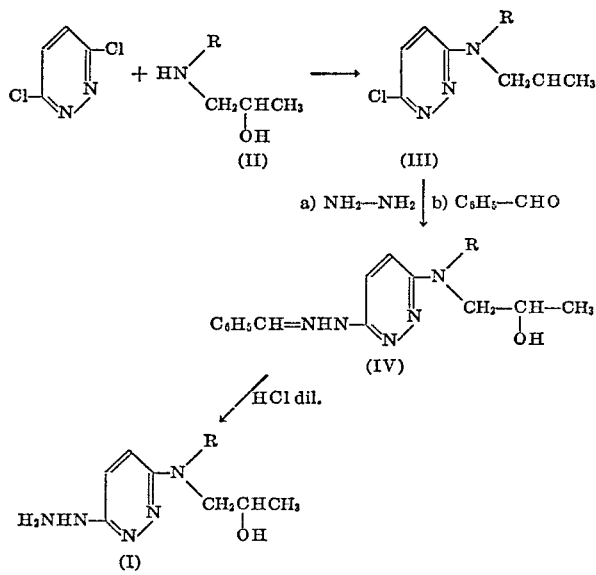

In the outlined instance, the first stage of the reaction is conducted in the absence of solvents, dichloropyridazine being added in small portions to the adequately preheated aminoalcohol (II).

The so obtained derivative (III) is reacted, while heating, with hydrazine in the form of the monohydrate, or, preferably, at a 95% concentration, and the reaction product is separated by the addition of benzaldehyde in the presence of an alkali carbonate or bicarbonate. The hydrazone (IV) that is thus obtained, can be easily separated from both the unreacted starting product and the residual hydrazine which has been converted into benzaldazine, which can be extracted by means of ethyl ether, benzene, or any organic solvent immiscible with water. The benzalderivative (IV), after recrystallization, is heated with dilute hydrochloric acid; the benzaldehyde that forms is thus eliminated by slow distillation. Derivative (I) separates in the form of the stable, pure dihydrochloride when the final solution is evaporated to dryness.

The aldehydes that can be used in the process of this invention are benzaldehyde, benzaldehyde derivatives having substitutions in the phenyl group, and in fact any aldehyde which can form, with hydrazine, double bases that are soluble in water-immiscible organic solvents, and that, therefore, can be extracted by the use of such solvents. A critical character of the process of the invention is to be found precisely in the formation of such hydrazine compound, which makes its elimination simple, so that the recovery of the desired Compounds I becomes easier, or, in some instances, just possible. To this purpose, the preferred aldehyde is benzaldehyde.

The organic solvent that is used for the extraction of the aldehyde-hydrazine double base is preferably ether or benzene. The nature of such solvent is not critical to the effect of the process of this invention, as long as said solvent is immiscible with water and capable of extracting the aforesaid double base, but not the hydrazone (IV).

The 3,6-dihalogenopyridazine is preferably either 3,6-dichloro, or 3,6-dibromo-pyridazine.

The hypotensive effect of the new compounds of this invention was surveyed using the bloody method upon anaesthetized cats, by measuring the decrease in systemic arterial pressure after intravenous administration of an aqueous solution of the product. The antihypertensive activity was evidenced using the Friehel and Vreden bloodless method (Arch. Exp. Pathol. Pharmacol., 232, 419, 1958) upon mice made hypertensive by the Grollman method (Proc. Soc. Exptl. Biol. Med., 57, 102 (1944)); by measuring the decrease in arterial pressure after "per os" administration of an aqueous solution of the product. The minimum dosages of some derivatives of Formula I effective in the two aforesaid tests and the approximate $LD_{50}$ i.p., measured in rats with the Irwin test (Gordon Res. Conf. Med. Chem., New London, N.H., Mar. 7–8, 133 (1959)), are shown in the following table as compared to hydralazine, which is a widely used drug in hypertensive conditions.

| Compound according to Formula I | | $LX_{50}$ | Effective dosage, mg./kg.[1] | Half effect time, min. | Effective dosage, mg./kg.[2] |
|---|---|---|---|---|---|
| Number | R | | | | |
| 1 | $CH_2CH_2OH$ | >1,900 | 0.1 | 135 | 1 |
| 2 | $CH_2CHCH_3$ $\quad\;\;$OH | >1,000 | 0.05 | 120 | 0.5 |
| 3 | $CH_3$ | >1,000 | 0.1 | 140 | 1 |
| Hydralazine | | 100 | 0.5 | 100 | 1 |

[1] I.v. anaesthetized cat.
[2] Per os hypertensive cat.

It appears, from the above data, that the therapeutic value of the new products of this invention, as compared to that of hydralazine, is sharply different and, in fact, decidedly higher. It can also be noted, when the values of the half effect times are compared, that the hypotensive effect of the compounds of this invention lasts for a longer period of time. It may be suggested, though without any intention of binding this invention to any theory, that the presence in the molecular structure of at least one secondary alcoholic group, more hydrophylic than the primary alcoholic group, may exert a positive influence upon the therapeutic properties of the drug.

Here follow some examples apt to elucidate the preparation of the new Compounds (I), (III) and (IV) by means of the new methods of this invention. However, no limitation to the scope of the invention is to be inferred from said examples.

EXAMPLE 1

(a) 3-Benzalhydrazino-6-(N-(2-hydroxyethyl)-2-hydroxypropylamino)-pyridazine

By means of a spatula, 27.5 grams of 3,6-dichloropyridazine are added in several portions, with stirring, to 43.8 grams of N-(2-hydroxyethyl)-2-hydroxypropylamine preheated to 140° C. When the addition is completed, the temperature is maintained for half an hour, the mixture is then cooled and 50 ml. of water are added. The solution is extracted through continuous operation in a perforator with acetic ether; 3-chloro-6-(N-(2-hydroxyethyl)-2-hydroxypropylamino)-pyridazine crystallizes in the amount of 30 grams (70% yield) when the organic phase is concentrated. It has M.P. 69–71° C.

18.5 grams of the product are heated for 3 hours with 100 ml. of 95% hydrazine in a flow of nitrogen, the excess hydrazine is then eliminated by vacuum distillation. The residue is dissolved in absolute ethanol, 24 grams of potassium carbonate and 35 ml. of benzaldehyde are added and the mixture is refluxed for 90 minutes. The solvent is then distilled off, and the residue is taken up first with ethyl ether and then with water, recrystallizing it finally from ethanol. 3-benzalhydrazino-6-(N-(2-hydroxyethyl)-2-hydroxypropylamino)pyridazine is thus obtained with a very good yield. It has M.P. 174–176° C. (dec), infrared spectrum (Nujol): 3250 (O—H), 1590–1550 (C=C and C=N), 1070 (C—O), 823 (CH pyridazine), 760 (CH phenyl) cm.$^{-1}$.

Analysis.—Calculated for $C_{16}H_{21}N_5O_2$: C, 60.24; H, 6.70; N, 22.41%. Found: C, 58.98; H, 6.81; N, 21.91%.

(b) 3-Hydrazino-6-(N-(2-hydroxyethyl)-2-hydroxypropylamino)-pyridazine

A solution of 9.46 grams of the above mentioned benzal derivative in 200 ml. of 15% HCl is heated to the boiling point with stirring, thus eliminating by slow distillation the benzaldehyde that forms. When the reaction is over, the remaining solution is concentrated to dryness under vacuum and the residue is recrystallized from ethanol-ethyl ether. This way, 3-hydrazino-6-(N-2-hydroxyethyl)-2-hydroxypropylamino)-pyridazine is obtained with a very good yield in the form of the dihydrochloride, having M.P. 178–180° C. (dec). Infrared spectrum (Nujol): 3350 (O—H), 3100–2000 (NH+), 1600–1570 (C=C and C=N and δ NH), 1070 (C—O), 838 (CH pyridazine) cm.$^{-1}$.

*Analysis.*—Calculated for $C_9H_{17}N_5O_2 \cdot 2HCl$: C, 36.00; H, 6.38; N, 23.31; Cl, 23.60%. Found: C, 36.00; H, 6.41; N, 23.40; Cl, 23.10%.

EXAMPLE 2

(a) 3-Benzalhydrazino-6-(bis-(2-hydroxypropyl) amino)-pyridazine

Six grams of 3,6-dichloropyridazine are added in small portions and with stirring to 10.7 grams of bis-(2-hydroxypropyl)amine preheated to 140° C. When the addition is over, the heating is protracted for half an hour, the mixture is then cooled and crushed with 20 ml. of water. The product is collected over vacuum and recrystallized from ethyl acetate. This way, 4.05 grams (40% yield) of 3-chloro-6-(bis-(2-hydroxypropyl)amino)-pyridazine are obtained. It has M.P. 142–145° C.

Five grams of the product are heated for 6 hours with 50 ml. of hydrazine hydrate and then concentrated to dryness by vacuum distillation. The residue is taken up with ethanol, 6.5 grams of potassium carbonate and 10 ml. of benzaldehyde are added, and the mixture is refluxed for 90 minutes. The solvent is then removed by vacuum distillation and the residue is accurately washed, with ethyl ether first and then with water. The product is purified by recrystallization from ethanol, thus obtaining 3-benzalhydrazino - 6 - (bis-(2-hydroxypropyl)amino)-pyridazine with a high yield. It has M.P. 184–187° C. Infrared spectrum (Nujol): 3300 (O—H), 1570–1540 (C=C and C=N), 1070 (C—O), 826 (CH pyridazine), 756 (CH phenyl) cm.$^{-1}$.

*Analysis.*—Calculated for $C_{17}H_{23}N_5O_2$: C, 62.00; H, 7.03; N, 21.32%. Found: C, 63.01; H, 7.24; N, 21.44%.

(b) 3-Hydrazino-6-(bis-(2-hydroxypropyl) amino)pyridazine 2.78 grams of the above mentioned benzaldehyde derivative are heated with stirring in 75 ml. of 15% HCl, distilling off in the meanwhile the benzaldehyde that forms. When the reaction is over, the solution is concentrated to dryness under vacuum and the residue is recrystallized from ethanol, thus obtaining 3-hydrazino-6-(bis-(2-hydroxypropyl)amino)pyridazine in the form of the dihydrochloride, having M.P. 191–192° C. (dec). Infrared spectrum (Nujol): 3400 (O—H), 3100–2000 (NH+), 1600–1570 (C=C, C=N and NH₂), 1070 (C—O), 845 (CH pyridazine) cm.$^{-1}$.

*Analysis.*—Calculated for $C_{10}H_{19}N_5O_2 \cdot 2HCl$: C, 38.58; H, 6.73; N, 22.28; Cl, 22.53%. Found: C, 38.49; H, 7.00; N, 22.00; Cl, 22.27%.

EXAMPLES 3, 4 AND 5

The following are prepared in the same way as in Examples 1 and 2:

(3) 3-hydrazino-6-(N-methyl-2-hydroxypropylamino)-pyridazine dihydrochloride, having M.P. 204–205° C. (dec.).
(4) 3-hydrazino-6-(N-ethyl-2-hydroxypropylamino)-pyridazine dihydrochloride, having M.P. 195–198° C. (dec.).
(5) 3-hydrazino-6-(N-propyl-2-hydroxypropylamino)-pyridazine dihydrochloride, having M.P. 190° C. (dec.).

I claim:

1. A compound of the formula:

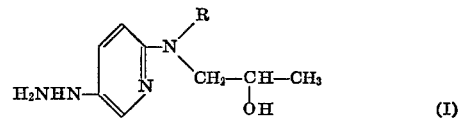

wherein R represents —CH₃, —C₂H₅, —C₃H₇,

—CH₂CH₂OH or

and its non toxic salts with common mineral acids.

2. A compound according to claim 1, wherein R represents

3. A compound according to claim 1 wherein R is —CH₃.

4. A compound according to claim 1 wherein R is —C₂H₅.

5. A compound according to claim 1 wherein R is —C₃H₇.

6. A compound according to claim 1 wherein R is —CH₂CH₂OH.

References Cited

UNITED STATES PATENTS 3,637,690  1/1972  Anderson et al. ____ 260—250 A

FOREIGN PATENTS 262,114  9/1949  Switzerland _____ 260—250 A

OTHER REFERENCES

Smith, The Chemistry of Open-Chain Organic Nitrogen Compounds, vol. II, frontispiece and page 162, W. A. Benjamin, Inc., New York (1966).

JOHN D. RANDOLPH, Primary Examiner

U.S. Cl. X.R.

260—250 A; 424—250

UNITED STATES PATENT OFFICE
CERTIFICATE OF CORRECTION

PATENT NO. : 3,769,278
DATED : October 30, 1973
INVENTOR(S) : Giorgio Pifferi

It is certified that error appears in the above-identified patent and that said Letters Patent are hereby corrected as shown below:

Column 3, in formula III, "-CH$_2$CHCH$_3$", should read
-- -CH$_2$CH(OH)CH$_3$ --; Column 3, Line 72, "Friehel" should read --Friebel--;

Column 4, in the third column of the table "LX$_{50}$" should read --LD$_{50}$-- and "1,900" should read --1,000--;

Claim 1, in the formula, the ring structure should be 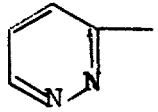 .

Signed and Sealed this
second Day of September 1975

[SEAL]

Attest:

RUTH C. MASON
Attesting Officer

C. MARSHALL DANN
Commissioner of Patents and Trademarks